United States Patent

[11] 3,634,591

[72] Inventor Horst G. Langer
Wayland, Mass.
[21] Appl. No. 840,363
[22] Filed July 9, 1969
[45] Patented Jan. 11, 1972
[73] Assignee The Dow Chemical Company
Midland, Mich.

[54] FURNACE ASSEMBLY FOR THERMAL ANALYSIS USE
5 Claims, 3 Drawing Figs.

[52] U.S. Cl.................................................. 13/31,
250/41.9 C
[51] Int. Cl................................................. H05b 3/00
[50] Field of Search........................................ 13/31, 25;
250/41.9 C, 41.9 S, 41.9 SR

[56] References Cited
UNITED STATES PATENTS
3,414,661 12/1968 Reed............................ 13/25 X
3,431,451 3/1969 Brunnee et al................ 250/41.9 S X Primary Examiner—Bernard A. Gilheany
Assistant Examiner—R. N. Envall, Jr.
Attorneys—Griswold and Burdick and Earl D. Ayers ABSTRACT: This invention relates to a heating furnace assembly which is adapted to be coupled to and become a part of a mass spectrometer adjacent to the ion source (usually) within the instrument. The furnace is a radiant heating device utilizing a helical coil and reflective surface and is adapted to be controlled by means of temperature sensing means disposed within a separate thermal analysis cell which is adapted to be disposed within the furnace.

PATENTED JAN 11 1972 3,634,591
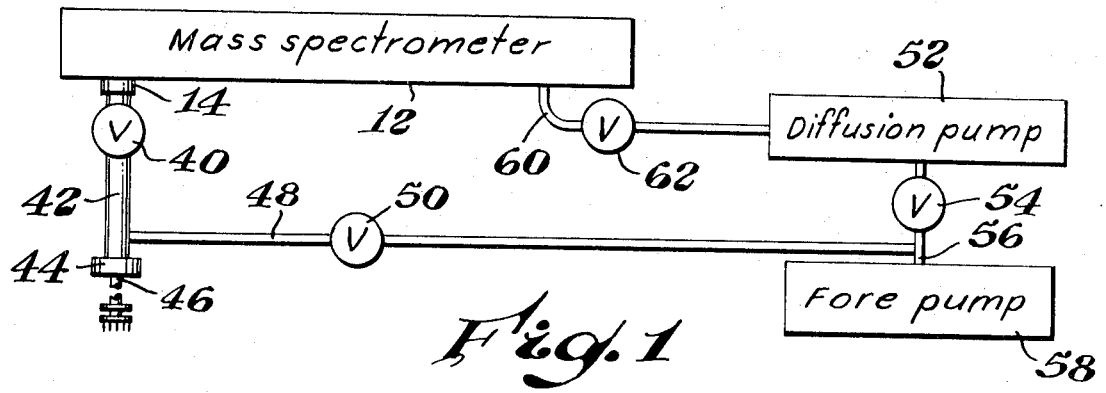
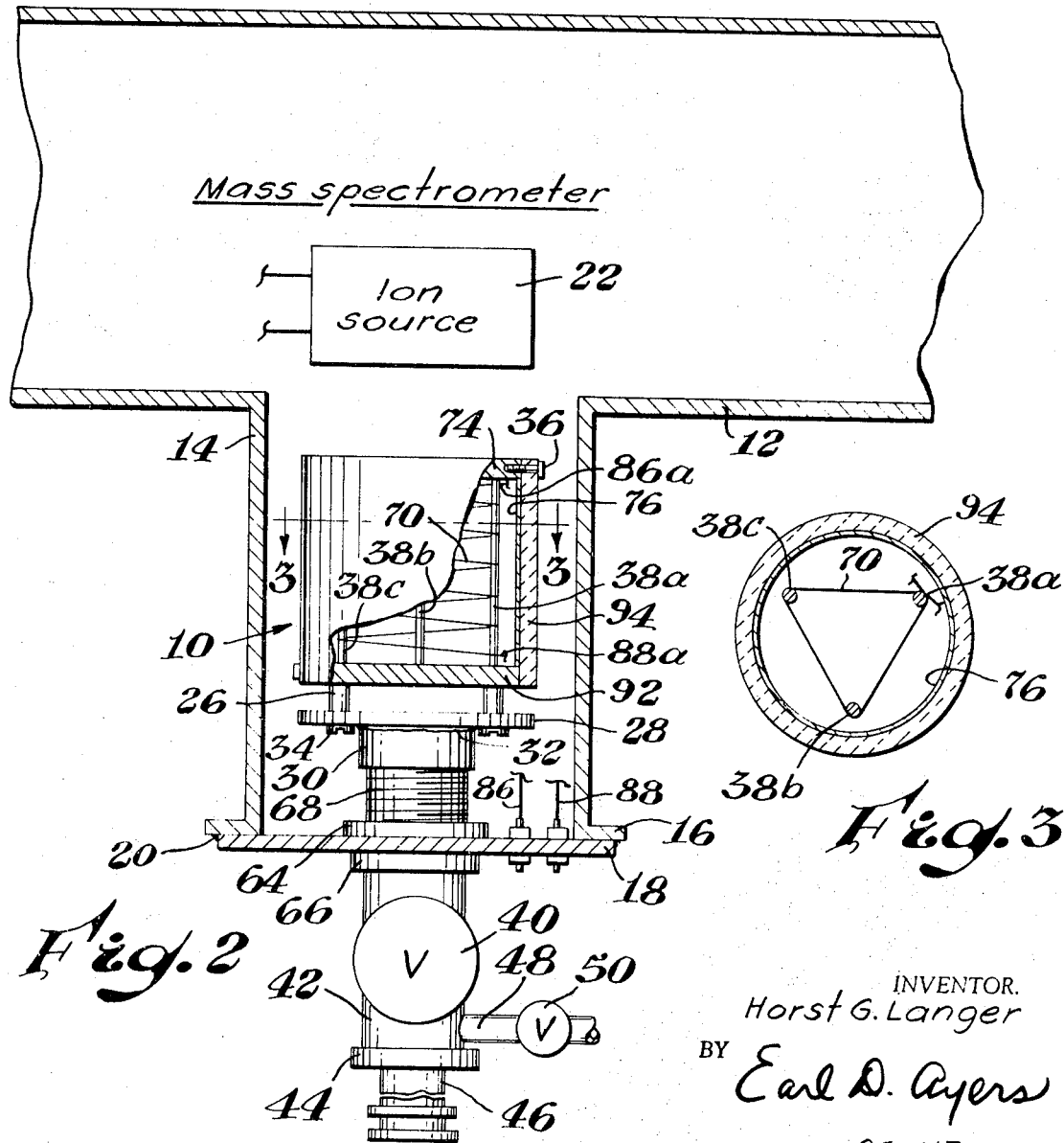
INVENTOR.
Horst G. Langer
BY Earl D. Ayers
AGENT

FURNACE ASSEMBLY FOR THERMAL ANALYSIS USE

BACKGROUND OF THE INVENTION

This invention relates to radiant-heated furnaces adapted to receive a thermal analysis cell and particularly to furnace and cell insertion assemblies which are adapted for use under high-vacuum conditions.

Accordingly, a principal object of this invention is to provide an improved thermal analysis receiving and heating assembly for use under high-vacuum conditions.

Another object of this invention is to provide an improved radiant-heating furnace and thermal analysis cell-receiving assembly for use under high-vacuum conditions in a mass spectrometer.

Even though mass spectrometers are sometimes equipped with devices which allow the heating of samples within the confinement of the mass spectrometer vacuum or within the ion source, and even if such devices sometimes also allow the measurement of sample temperatures during the heating process, these devices do not allow the operation known as thermal analysis. In such high-vacuum operations it is essential that the sample be heated at a linear predetermined rate of heating, that the sample temperature is known and indicated at all times, and for differential thermal analysis operations the sample temperature is continuously compared with that of an inert material in the same cell. In general, this requires that three thermocouples located in the thermal analysis cell should be precisely at the same temperature at all times unless a chemical reaction occurs in the sample. Thus, it is also of extreme importance that equal heat transfer is guaranteed from the heat source furnace to the thermal analysis cell, that no temperature gradient exists in the cell itself, that fast heat transfer is provided from the cell to the sample and that each thermocouple remains electrically insulated.

In addition, to make a cell useful it must be possible to load a sample into the cell and introduce the cell with the sample into a Mass Spectrometer without shutting down the operation of a Mass Spectrometer or other evacuated systems.

In accordance with this invention, there is provided a furnace which is cylindrical in overall configuration and is supported by thermally insulating elements from a metal disc attached to a valved tubular thermal analysis cell input and sealing assembly.

The furnace has structure defining, in effect, an axial concentric bore with a reflective inner surface extending therethrough which is aligned with the cell input and sealing assembly. The furnace has an array of axially disposed support rods within said bore, the array being dimensioned to fit around an inserted cell assembly. A wire heating filament is wrapped around the support rods, with the leads from the filament passing through the metal disc and adapted to be coupled to a controlled energization source (not shown).

The assembly is inserted into a mass spectrometer adjacent to the ion source.

The invention, as well as additional objects and advantages thereof will best be understood when the following detailed description is read in connection with the accompanying drawing, in which:

FIG. 1 is a diagrammatical view showing apparatus in accordance with this invention coupled to a mass spectrometer;

FIG. 2 is a side elevational view, partly in section, of a furnace and cell probe insertion and sealing assembly in accordance with this invention, and FIG. 3 is a sectional view taken along the line 3—3 of FIG. 2.

Referring to the drawing, and particularly to FIG. 1, there is shown a mass spectrometer 12 having a tubular member 14 extending perpendicularly therefrom. An additional tubular element 42 having a compression coupling 44 at its outer end and having a ball-type vacuum sealing valve 40 adjacent to the member 14 is coupled to the outer end of the member 14. A cell-probe assembly 46 (see FIG. 2) is shown partly inserted into the entry and sealing assembly. A diffusion pump 52 is coupled by means of valve 54 and tube 56 to a fore pump 58 and by means of a tube 60 and valve 62 to the mass spectrometer 12. The tubular element 42 is coupled through tube 48 and valve 50 to the tube 56 between the valve 54 and the fore pump 58.

Referring now to FIG. 2, as well as to FIG. 1, there is shown the mass spectrometer tube 12 having a tubular member 14 extending transversely therefrom adjacent to the ion source 22 of the mass spectrometer. The member 14 has an outwardly extending flange 16 at its outer end. A metal plate 18 on which is supported the furnace and cell-probe entry and sealing assembly 10 is sealed, as by the fillet 20, for example, to the flange 16. A threaded tube 68 extends transversely through the plate 18 generally in coaxial relationship with the member 14. A tubular element 42 containing a so-called vacuum ball valve 40 is coupled to the tube 68 by means of coupling 66. A seal-nut element 64 seals the tube 68 and element 42 (and coupling 66) against the plate 18 through which the tube 68 passes.

A coupling 30 having a flange element 28 welded thereto as at 28 is threadedly coupled to the end of the tube 68 which lies within the tubular member 14. A metal annular plate 92, usually copper or brass and of substantially larger diameter than the diameter of the coupling 30 is coupled to the top of the flange element 28 by means of screws 34 and spacer sleeves 26.

An annular sleeve 94 having a heat-reflective inner surface 76, usually a coating, thereon, surrounds and is supported from the plate 92 to which it is secured by screws.

An annular plate 74, usually made of metal and at least approximately of the same outer dimension as the diameter of the annular plate 92, is disposed parallel to the plate 92 and is secured to the sleeve 94 by screws 36.

An array of electrically insulating support rods 38a, 38b, and 38c are disposed between the annular plates 74, 92 and are disposed so that the cell 46 may pass within the array without touching the support rods or the helical heating coil 70 wound along the support rods.

The wire leads 86a, 88a from the helical coil 70 being brought through the plate 18 by suitably insulated feed through lines 86, 88, respectively.

In operation, with the mass spectrometer pumped down by the diffusion pump 52 and with valves 40 and 54 closed, the cell probe 46 is inserted in the tubular element 42 between the closed valve 40 and the "opened" compression fitting 44. The compression fitting is then tightened around the tube of the probe 46 and, after a sufficient reduction of pressure by means of the fore pump 58, the valve 50 is closed and ball valve 40 and valve 62 are opened. The cell probe 46 is then slowly pushed through and past the compression fitting 44, past the valve 40 and into the bore 70 in the furnace body inside of the helical winding 70. The heating coil 70 is energized at a controlled rate from a controller-energization source (not shown) in coordination with the readings from control thermocouples in the sample cell-probe assembly 46, as is known to those skilled in the art of differential thermal analysis.

Because of the location of the furnace adjacent to the ion source 22, the material vaporized on heating of the sample material carried in the cell-probe 46 is emitted into the ion source area of the mass spectrometer, where the vaporized material is ionized and analysis of the sample by mass spectrometric means occurs simultaneously with the differential thermal analysis of the sample.

A cell-probe assembly which is especially well adapted for use with this invention is disclosed and claimed in Horst G. Langer's copending application Ser. No. 840,281, entitled, "Differential Thermal Analysis Cell Assembly," filed concurrently herewith, now abandoned.

The coating 76 may be on a thin-walled metal backing instead of a ceramic sleeve as shown. Further, preferably the reflective coating would be on both sides of the metal backing sheet (or the metal backing sheet may have polished surfaces and thus need no coating). If the metal backing sheet is quite thin, the heat absorbed may and desirably is sufficient to prevent the condensation of sample vapor thereon. Similarly, the support rods 38a, b, c are thin enough to be heated by reflected heat from the coating 76 and winding 70 to prevent the condensation thereon of vaporized sample material.

The heat-reflective coating 76 and surrounding winding 70 cause the (silver) block of the cell assembly to be easily and controllably heated.

What is claimed is:

1. A furnace and sample insertion assembly for use under high-vacuum conditions, comprising tubular means, an annular element having a central bore and which is at least as large as the inner diameter of said tubular means, said annular element being disposed perpendicularly with respect to the longitudinal axis of said tubular means and secured thereto, an array of rodlike support elements disposed perpendicularly with respect to said annular element and secured adjacent to the outer periphery of said annular element, a disc, said disc being disposed above said annular element and coupled to said support elements, a heater winding, said heater winding being disposed around said support elements between said annular element and said disc, a hollow cylindrically shaped heat reflector, said heat reflector surrounding said support elements between said annular element and said disc, a tubular element, the longitudinal axis of said tubular element being aligned perpendicularly with respect to a flanged mounting plate, said flanged plate extending transversely from said tubular element intermediate the ends thereof, said flanged plate being hermetically sealed to said tubular element, said tubular element having a valve therein on the side of said flanged plate remote from said heater winding, said tubular element having an inner diameter which is slightly larger than the diameter of a thermal analysis cell assembly adapted to be inserted therethrough and into the space within said heater winding, means for sealing said tubular element to said cell assembly, and lead means for energizing said heater winding.

2. An assembly in accordance with claim 1 wherein said means for sealing the tubular element to said cell assembly comprises a compression seal.

3. An assembly in accordance with claim 1, wherein said reflector element is supported on a tubular sleeve which is mechanically coupled to at least one of said discs.

4. An assembly in accordance with claim 1, wherein said support elements are made of a vitreous material.

5. An assembly in accordance with claim 1, wherein said flanged plate is adapted to be coupled to a mass spectrometer.

* * * * *